Patented Aug. 13, 1929.

1,724,706

UNITED STATES PATENT OFFICE.

ROBERT GRIESSBACH AND OTTO AMBROS, OF LUDWIGSHAFEN-ON-THE-RHINE, GERMANY, ASSIGNORS, BY MESNE ASSIGNMENTS, TO WINTHROP CHEMICAL COMPANY, INC., OF NEW YORK, N. Y., A CORPORATION OF NEW YORK.

VALUABLE PRODUCTS FROM ORGANIZED SUBSTANCES.

No Drawing. Application filed March 31, 1928, Serial No. 266,450, and in Germany April 6, 1927.

This invention relates to the production of valuable products from micro-organisms or from animal or vegetable substances by extraction, pressing and the like.

In preparative chemistry use is frequently made of the synthetic action of the living cell for the synthesis of many compounds of high molecular weight. In particular substances having a very unstable character can in many cases only be obtained according to this biological method. It is however often a matter of great difficulty to separate the compounds from the cell materials without subjecting the compounds to undesired changes.

We have now found that the recovery from micro organisms, animal or vegetable substances, these being hereinafter referred to as organized materials of products synthesized by the action of cells by extraction, pressing and the like may be carried out in a very advantageous manner by subjecting the said organized materials to an enzymatic degradation by which means the cell walls are dissolved. This may be carried out by the addition of enzymes having such specific action or by autolysis which, for example, may be initiated by poisoning the cells. In this way it is possible to carry out this very mild process of destroying the cells to any desired extent.

The product thus obtained, in which the amount of dry substances present remains practically unchanged by the enzymatic reaction, may be treated further in any known manner for example by extraction with solvents. This process has the great advantage as compared with the direct extraction of the initial materials that the product to be recovered is taken up far more easily and completely by the solvents.

The following example will further illustrate the nature of the said invention which however is not limited thereto.

*Example.*

If yeast be extracted in order to recover ergosterol by the known method with an excess of alcohol and the ergosterol ester thus obtained be saponified with alcoholic potash and the ergosterol ethered out, 2.97 grams of ergosterol having a melting point of 140° to 145° C. are recovered from 2 kilograms of ordinary pressed yeast having 25 per cent of dry substance.

If, however, 2 kilograms of yeast are first subjected to a fargoing autolysis which may, for example, be initiated by an addition of 50 cubic centimeters of acetic ester, 4.287 grams of crude ergosterol having a melting point of 135° C. are obtained in the manner above described. By recrystallizing from alcohol, 3.63 grams of pure ergosterol are obtained, that is to say, an increase of yield of about 20 per cent.

What we claim is:—

1. A process for the production of valuable products from organized substances by extraction which consists in subjecting the said initial materials to enzymatic degradation suitable to dissolve the cellular walls prior to the extraction.

2. A process for the production of ergosterol from yeast by extraction which consists in subjecting the yeast to enzymatic degradation, prior to the extraction.

3. A process for the production of ergosterol from yeast by extraction which consists in subjecting the yeast to autolysis, prior to extraction.

In testimony whereof we have hereunto set our hands.

ROBERT GRIESSBACH.
OTTO AMBROS.